(12) United States Patent
Bartels et al.

(10) Patent No.: US 8,062,181 B2
(45) Date of Patent: Nov. 22, 2011

(54) METHOD AND CONTROL DEVICE FOR ADJUSTING A ROTATIONAL SPEED OF A SHAFT OF A GEAR CHANGE TRANSMISSION

(75) Inventors: Ulrich Bartels, Stuttgart (DE); Manfred Guggolz, Rutesheim (DE); Werner Hillenbrand, Neuffen (DE); David Ulmer, Filderstadt (DE)

(73) Assignee: Daimler AG, Stuttgart (DE)

( * ) Notice: Subject to any disclaimer, the term of this patent is extended or adjusted under 35 U.S.C. 154(b) by 904 days.

(21) Appl. No.: 12/012,495

(22) Filed: Feb. 1, 2008

(65) Prior Publication Data
US 2008/0227593 A1  Sep. 18, 2008

Related U.S. Application Data

(63) Continuation-in-part of application No. PCT/EP2006/006936, filed on Jul. 15, 2006.

(51) Int. Cl.
*B60W 10/02* (2006.01)
*B60W 10/04* (2006.01)
*B60W 10/10* (2006.01)
*F16D 23/10* (2006.01)

(52) U.S. Cl. ............. 477/176; 477/180; 192/103 R

(58) Field of Classification Search .......... 477/176, 477/180
See application file for complete search history.

(56) References Cited

U.S. PATENT DOCUMENTS

| 6,332,860 B1 | 12/2001 | Hubbard et al. |
| 7,044,888 B2 * | 5/2006 | Lee et al. ............ 477/167 |
| 2003/0125161 A1 * | 7/2003 | Tokura et al. ......... 477/176 |

FOREIGN PATENT DOCUMENTS

| DE | 199 52 862 | 5/2001 |
| DE | 102 09 512 | 11/2002 |
| DE | 102 32 495 | 4/2003 |
| EP | 0 536 932 | 4/1993 |
| EP | 0 645 277 | 3/1995 |

* cited by examiner

*Primary Examiner* — Edwin A Young
(74) *Attorney, Agent, or Firm* — Klaus J. Bach

(57) ABSTRACT

In a method and control device for adjusting a rotational speed of a shaft of a gear change transmission of a motor vehicle, a torque required for the acceleration of the transmission and derived from a drive motor is transmitted by means of an automated clutch and using the torque the rotational speed of the shaft is precisely and rapidly adjusted to a range around a target rotational speed by defining a desired value for a position of the clutch on a rotational speed difference between a measured rotational speed of the shaft and a target rotational speed so that the gear can then rapidly be changed.

13 Claims, 3 Drawing Sheets

13

METHOD AND CONTROL DEVICE FOR ADJUSTING A ROTATIONAL SPEED OF A SHAFT OF A GEAR CHANGE TRANSMISSION

This is a Continuation-In-Part Application of pending International Patent Application PCT/EP2006/006936 filed Jul. 15, 2006 and claiming the priority of German Patent Application 10 2005 036 477.2 filed Aug. 3, 2005.

BACKGROUND OF THE INVENTION

The invention relates to a method for adjusting a rotational speed of a shaft of a gear change transmission with an automated clutch, and to a control device of a gear change transmission having such an automated clutch arranged between the transmission and an associated engine.

DE 102 09 512 A1 describes a method for adjusting a rotational speed of a shaft of a synchronized gear change transmission. Arranged between the gear change transmission and the engine is an automated clutch. During a gear change of the gear change transmission, in order to relieve the synchronizer of the target gear of load, the clutch is set such that a torque is transmitted from the engine to the shaft and the shaft is thereby accelerated. DE 102 09 512 A1 does not give any specifications regarding the value of the torque or how the clutch position which is to be controlled.

It is the object of the present invention to provide a way by which precise and fast adjustment of the rotational speed of a shaft a gear shift transmission to a range around a certain target rotational speed can be achieved.

SUMMARY OF THE INVENTION

In a method and control device for adjusting a rotational speed of a shaft of a gear change transmission of a motor vehicle, a torque required for the acceleration of the transmission is derived from a drive motor and is transmitted by means of an automated clutch and the rotational speed of the shaft is precisely and rapidly adjusted to a range around a target rotational speed by defining a desired value for a position of the clutch, the torque required of the clutch for the speed adjustment being determined depending on a rotational speed difference between a measured rotational speed of the shaft and a target rotational speed thereof.

According to the invention, a nominal value for a clutch position of the clutch, and therefore the transmissible torque of the clutch, is defined as a function of a rotational speed difference between a measured rotational speed of the shaft and a target rotational speed. The clutch is in particular a friction clutch. The target rotational speed can for example correspond exactly or approximately to the so-called synchronous rotational speed of the target gear. The synchronous rotational speed of the target gear is the rotational speed of the shaft after the engagement of the target gear. Said rotational speed is dependent on the transmission ratio of the target gear and on the speed of the motor vehicle.

With the method according to the invention, it is for example possible for a countershaft or a transmission input shaft to be adjusted, in particular accelerated, into a range around the target rotational speed. In a so-called non-synchronized transmission or claw shift transmission, that is to say a transmission without synchronizing devices for every gear, the engagement of the target gear is possible only if the rotational speed of the countershaft is in a range around the synchronous rotational speed.

The adjustment of the rotational speed is possible with the method according to the invention even when the rotational speed of the drive engine is not yet in a range around the rotational speed which is present after the engagement of the target gear. The rotational speed is determined for example from the synchronous rotational speed of the countershaft and any transmission ratio of a front-mounted group. The synchronization in gearwheel change transmission can therefore take place substantially independently of the adjustment of the rotational speed of the drive engine. The target gear can thereby be engaged very quickly. If the rotational speed of the drive engine has not yet reached the required rotational speed after the engagement of the target gear, the adaptation of the rotational speed of the engine can be obtained by closing the clutch.

If the rotational speed of the engine is already in said range, the clutch can be closed to such an extent that no slip occurs at the clutch, whereby the rotational speed of the shaft of the gear change transmission is placed into the desired range around the target rotational speed.

The adjustment of the rotational speed can take place very precisely by taking into consideration the rotational speed difference between a measured rotational speed and the target rotational speed. This is important in particular because, when using the method, the drivetrain of the motor vehicle is disconnected, and therefore even very small torques can bring about a large acceleration of the shaft and therefore a very fast change in the rotational speed. The rotational speed difference can for example be taken into consideration in a very simple manner in that a relationship, for example in the form of a characteristic curve, between the rotational speed difference and the nominal value of the clutch position is stored in a control device of the gear change transmission.

Here, the measured rotational speed need not always correspond to the present rotational speed of the shaft. It is also possible that the rotational speed is measured possibly several times and the nominal value of the clutch position is determined on the basis of the resulting rotational speed difference determined therefrom.

In one embodiment of the invention, a clutch position for a contact point of the clutch is stored in a control device which activates the clutch and the gearwheel change transmission. The contact point is the point from which the clutch can transmit a torque. In a friction clutch, the contact point is the point at which the clutch linings come into contact. The nominal value of the clutch position is then defined relative to the contact point. Methods for determining the contact point are known. The determination can take place for example by means of the methods described in DE 199 52 862 A1 or DE 102 32 495 A1.

The position of the contact point can, in clutches which are of identical design in principle, fluctuate for production and tolerance reasons. In addition, the clutch position of the contact point can vary greatly over the service life of the clutch as a result of wear. When using the method according to the invention, the adjustment of the rotational speed of the shaft becomes more precise. This is the case in particular when the clutch position of the contact point is matched to the actual conditions at the clutch and is thereby adapted. It can thereby be ensured that the stored contact point always corresponds to the actual contact point of the clutch.

The clutch and the gearwheel change transmission can also be activated by separate control devices. Said control devices then have a signal connection to one another such that they can exchange the necessary signals.

In one embodiment of the invention, the nominal value of the clutch position is defined such that, in the event of a large rotational speed difference, the rotational speed of the shaft changes more quickly than in the event of a small rotational speed difference. In this way, the rotational speed of the shaft can be changed in the direction of the target rotational speed very quickly, and it is at the same time prevented that the rotational speed of the shaft leaves a range around the target rotational speed again too quickly. In the event of a gearchange, an engagement of the target gear is thereby possible very quickly and the possible time window for engaging the target gear is nevertheless not too short.

In one embodiment of the invention, a relationship between a characteristic variable which denotes an expected change in the rotational speed of the shaft and the clutch position is stored in the control device. The characteristic variable can in particular be embodied as a gradient of the rotational speed of the shaft over time. On the basis of said rotational speed difference, a nominal value for the characteristic variable is determined, and by means of the nominal value for the characteristic variable and the stored relationship, the nominal value for the clutch position is determined. The relationship can for example be embodied as a functional relationship or as a characteristic curve. It is likewise possible for the characteristic variable to be stored in a characteristic diagram as a function of the clutch position and of a further variable, such as for example a temperature of the clutch or of a transmission oil.

Here, the clutch position can be taken into consideration in absolute terms or relative to the stored contact point of the clutch.

The stored relationship can in particular be adapted on the basis of a comparison of the characteristic variable actually given at a set clutch position with the stored characteristic variable. The relationship can thereby be adapted to the actual conditions, as a result of which particularly precise adjustment of a desired characteristic variable is possible.

In one embodiment of the invention, on the basis of a present measured rotational speed of the shaft and the resulting rotational speed difference with respect to the target rotational speed, a desired profile of the rotational speed of the shaft is determined. The desired profile of the rotational speed is in particular composed of at least two sections with a constant rotational speed gradient. On the basis of the desired profile, a profile for the nominal value of said characteristic variable is determined, and by means of the stored relationship between the characteristic variable and the clutch position, the nominal value for the clutch position is determined. It is thereby possible to predefine a desired profile of the rotational speed which allows the range around the target rotational speed to be reached as quickly as possible and at the same time prevents an overshoot, that is to say a fast departure from the range around the target rotational speed. Reaction times of the clutch can be taken into consideration in the determination of the nominal profile. Said reaction times occur in particular in hydraulically or pneumatically actuated clutches. The reaction time is to be understood to mean the time between the activation of the clutch and the actual change in the rotational speed of the shaft.

Here, the desired clutch position can be defined as a function of the time distance from a starting time; the profile can thus be controlled in terms of time. It is likewise possible for the desired clutch position to be defined as a function of the rotational speed difference between the measured rotational speed of the shaft and the target rotational speed; the profile can then be controlled in terms of the rotational speed. If the desired profile is composed of sections with constant rotational speed gradients, it is for example possible to switch to another gradient when certain rotational speed difference thresholds are reached. A combination of a profile controlled in terms of time and a profile controlled in terms of rotational speed is also possible.

In one embodiment of the invention, in the determination of the desired profile of the rotational speed of the shaft, a possible change in the target rotational speed is taken into consideration. The target rotational speed can for example change if the underlying surface has a rising or a falling gradient or if the motor vehicle is braked by means of a service brake. The profile of the underlying surface can for example be determined from a comparison of the drive torque with the actual acceleration of the motor vehicle or from a digital road map.

It is ensured in this way that, during a gearchange, the target gear can be reliably engaged even when the synchronous rotational speed changes as a result of a change in the speed of the motor vehicle.

In one embodiment of the invention, the clutch position, proceeding from a start position, is varied in the direction of the closed position of the clutch, the rotational speed of the shaft is observed and in the event of a significant change in the rotational speed, the desired profile of the rotational speed is determined. The behavior of a clutch is not always reproducible. Long-term and short-term fluctuations occur. The determination of the desired profile of the rotational speed leads to the desired result in particular when the clutch has reached a position from which a further closure of the clutch brings about a significant change in the rotational speed of the shaft. Said position can be found very reliably by means of the described approach. The starting position is in particular selected such that no change in the rotational speed yet occurs. The significant change is for example detected when the gradient of the rotational speed exceeds a threshold value or the deviation of the rotational speed of the shaft from the rotational speed when approaching the start position exceeds a threshold value.

With the described relationship between the characteristic variable and the clutch position, the clutch position can also be stored relative to a clutch position at which the significant change in the rotational speed occurs.

In one embodiment of the invention, the profile of the rotational speed of the shaft is monitored, it is checked as to whether the profile meets a defined condition, and in the event of the condition being met, an offset value is determined, by which the nominal values of the clutch positions determined during the procedure are moved in the direction of the closed position. It can for example be checked as to whether the gradient of the rotational speed is lower than a limit value, for example 0, after a defined timespan after the setting of the starting position. In this case, it is assumed that the starting position has been selected too far in the direction of the open position of the clutch. The offset can be fixedly predefined or can be determined as a function of the starting position, the rate of change of the clutch position, the stored contact position of the clutch and/or the stored relationship between the characteristic variable and the clutch position.

A start-out clutch position which is too far in the direction of the open position of the clutch can thereby be compensated for. Fast and reliable adjustment of the rotational speed is thus also permitted in this case.

In one embodiment of the invention, on the basis of a present rotational speed of the shaft and a momentary rotational speed gradient, a future profile of the rotational speed is estimated. On the basis of said estimate, it is checked as to whether the profile meets a defined condition. It is for example checked as to whether the gradient of the rotational speed exceeds a threshold or whether the estimated rotational speed reaches a range around the target rotational speed within a defined timespan. In the event of a positive result of the check, the nominal value of the clutch position is defined such that a gradient of the rotational speed of 0 is to be expected. As already mentioned, the method is carried out when the drivetrain is disconnected, such that only small torques are sufficient to bring about a change in the rotational speed of the shaft. The adjustment of small torques is very difficult, and so it can also occur that an excessively high gradient of the shaft is set and there is therefore the risk of the rotational speed of the shaft leaving the range around the target rotational speed again too quickly. When this risk has been detected, a clutch position is set at which a gradient of the rotational speed of 0 is to be expected. The clutch position is in particular stored in the control device and can for example be determined from the described relationship between the characteristic variable and the clutch position.

Further advantages of the invention will become apparent from the following description of exemplary embodiments of the invention which are illustrated in simplified form on the basis of the accompanying drawings:

DESCRIPTION OF PARTICULAR EMBODIMENT

Figure 1:
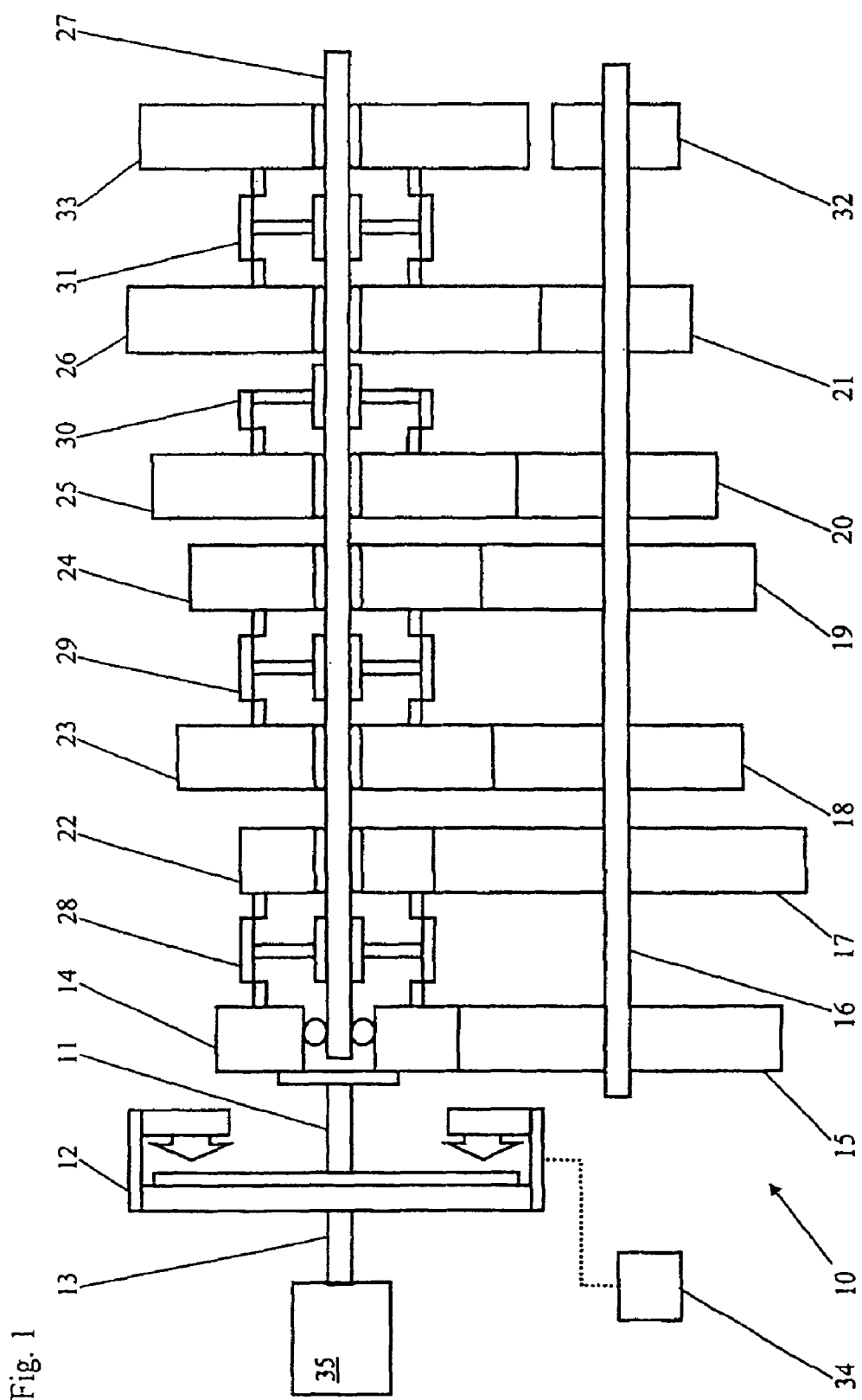
FIG. 1 shows a non-synchronized automatic gear change transmission.

As shown in FIG. 1, a non-synchronized gearwheel change transmission 10 has an input shaft 11 which can be coupled by means of an automated clutch 12 to a coaxially-arranged output shaft 13 of a drive engine 35. The clutch 12 can be engaged and disengaged by means of an operating device (not illustrated) which is activated by a control unit 34. The control unit 34 can thus set a position of the clutch 12. A gearwheel 14 is rotationally fixedly connected to the drive input shaft 11 and meshes with a gearwheel 15 which is rotationally fixedly connected to a countershaft 16 which is arranged parallel to the input shaft 11. Gearwheels 17, 18, 19, 20 and 21 for the 6th, 3rd, 4th, 2nd and 1st gear are rotationally fixedly arranged on the countershaft 16. The fixed wheels 17, 18, 19, 20 and 21 in each case mesh with associated loose wheels 22, 23, 24, 25 and 26 which are rotatably arranged on a transmission output shaft 27 which is arranged coaxially with respect to the input shaft 11. The loose wheel 22 can be rotationally fixedly connected by means of a sliding sleeve 28, the loose wheels 23 and 24 can be rotationally fixedly connected by means of a sliding sleeve 29, the loose wheel 25 can be rotationally fixedly connected by means of a sliding sleeve 30 and the loose wheel 26 can be rotationally fixedly connected by means of a sliding sleeve 31 to the transmission output shaft 27. The sliding sleeves 28, 29, 30, 31 can for this purpose be moved axially on the transmission output shaft 27 within certain limits by means of an operating device (not illustrated) which is likewise activated by the control device 34. The operating device can for example be hydraulically or pneumatically actuated.

If, for example, the 4th gear is engaged, the loose wheel 24 is rotationally fixedly connected by means of the sliding sleeve 29 to the transmission output shaft 27. The rotational speed and the torque of the drive engine 35 is then transmitted via the output shaft 13, the clutch 12, the input shaft 11, the gearwheels 14 and 15, the countershaft 16, the fixed wheel 19, the loose wheel 24 and the sliding sleeve 29 to the transmission output shaft 27. From the transmission output shaft 27, the rotational speed and the torque are transmitted by means of a drive input shaft (not illustrated) to a differential which, in a manner known per se, transmits the torque in equal or different proportions to drive wheels (not illustrated) via two drive output shafts (not illustrated).

During a gear change of the gear change transmission 10, the synchronization of the target gear, that is to say the adjustment of the rotational speed of the countershaft 16 to a range around a target rotational speed in the vicinity of the synchronous rotational speed, by means of the engine 35 must take place. The gear change transmission can also have a transmission brake, by means of which the countershaft can be braked.

Figure 2:
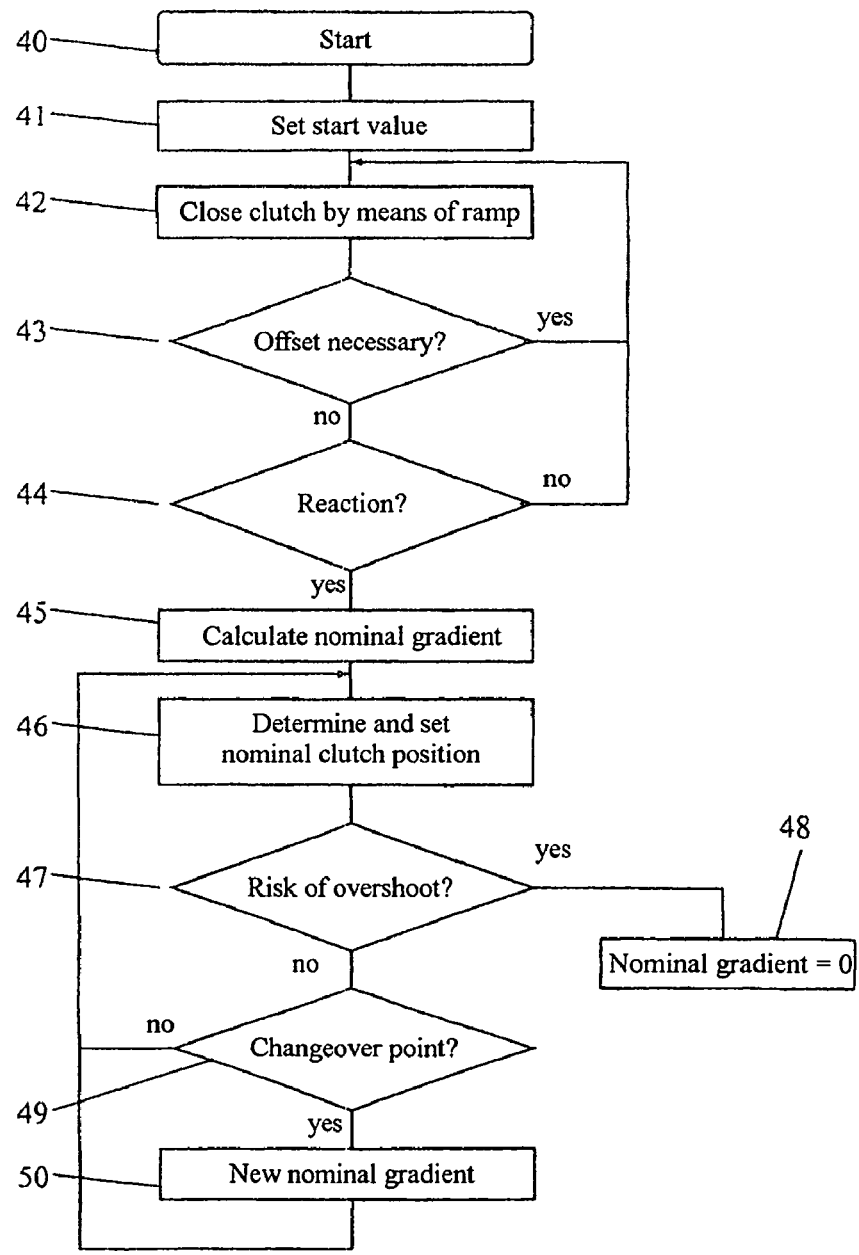
FIG. 2 shows a flow diagram of a method according to the invention.

FIG. 2 shows a flow diagram of a method for adjusting the rotational speed of the countershaft. In the profile, it is assumed that the rotational speed of the engine converted to the rotational speed of the countershaft is not in the range around the target rotational speed necessary for the engagement of the target gear. In this case, the clutch could be closed to such an extent that no slip occurs therein. The rotational speed of the countershaft would thereby be placed into the range around the target rotational speed without further measures.

The method starts in block 40. In block 41, a starting value for the clutch position is set. The starting value is determined from a clutch position, stored in the control device, for a contact point of the clutch, and a stored deviation from the contact point in the direction of the closed position of the clutch. The contact point of the clutch is determined in another method not described in any more detail here. The starting value is defined such that no change in the rotational speed of the countershaft yet occurs.

Subsequently, in block 42, the clutch is closed slowly by means of a ramp. For this purpose, the clutch is closed further by a defined magnitude with every time the block 42 is passed. In the following query block 43, it is checked whether an offset for the clutch position is necessary. For this purpose, it is checked as to whether, after a defined timespan, the gradient of the rotational speed of the countershaft is less than 0. If the result of the check is positive, then an offset is calculated, by which the nominal values of the clutch positions determined in the present execution of the method are moved in the direction of the closed position. The offset is calculated from the mean value of the previous nominal values of the clutch position minus the clutch position which would result in a gradient of the rotational speed of the countershaft of 0. The clutch position for a gradient of 0 is determined from a characteristic curve stored in the control device, in which characteristic curve the expected gradient of the countershaft is plotted against the clutch position relative to the contact position. Said characteristic curve is discussed in more detail further below.

If an offset is necessary, block 42 is repeated. If no offset is necessary, the method is continued in query block 44.

In query block 44, it is checked as to whether the countershaft has reacted to the closure of the clutch. For this purpose, it is checked during each passing of the query block 44 as to whether the gradient of the rotational speed of the countershaft is greater than a threshold value. If the check is negative, then block 42 is repeated.

If the check is positive, then the method is continued in block 45. In block 45, on the basis of the present rotational speed of the countershaft, the target rotational speed and an expected change in the target rotational speed, a desired profile of the rotational speed of the countershaft is defined. The target rotational speed is smaller, by a small difference value, than the synchronous rotational speed of the target gear which is determined by the present speed of the motor vehicle and the transmission ratio of the target gear. On the basis of an item of information regarding a rising or a falling gradient of the underlying surface, a future profile of the speed and therefore a change in the target rotational speed are also estimated.

Figure 3:
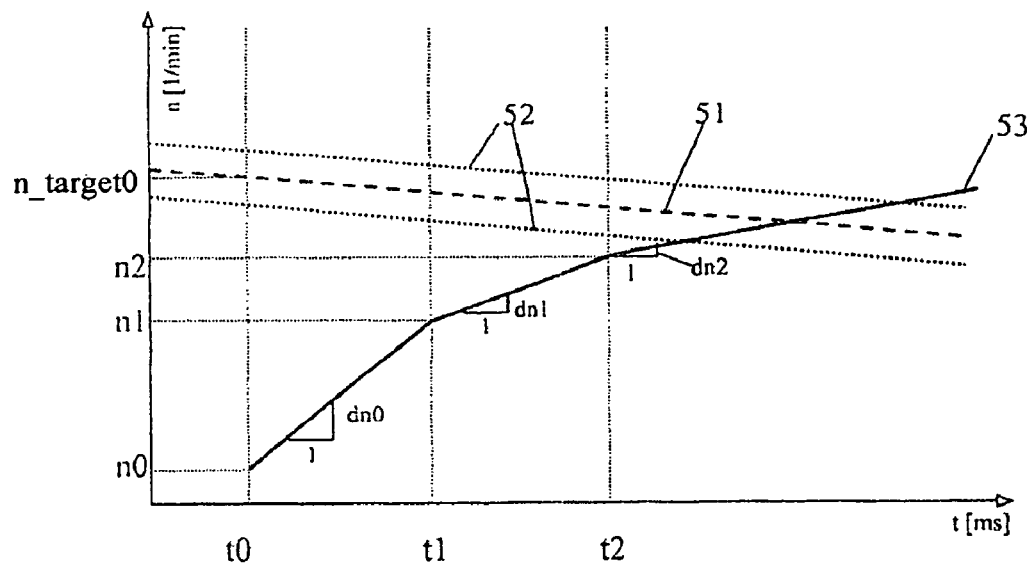
FIG. 3 shows a desired profile of a rotational speed of a shaft of the gear change transmission during a gearshift.

FIG. 3 illustrates a desired profile of the rotational speed of the countershaft over time. In the illustrated example, the target rotational speed 51 falls slightly since the motor vehicle is on a slight rising gradient. The dotted lines 52 denote a range around the target rotational speed 51 into which the rotational speed of the countershaft is to be placed. The desired profile of the rotational speed of the countershaft is illustrated as a line 53. Here, the rotational speed value n0 at the time t0 represents the present value of the rotational speed. The desired profile is composed of three sections of equal duration and in each case constant gradient. In defining the duration of the individual sections, the reaction time of the clutch and of the gearwheel change transmission has been taken into consideration. The duration is for example between 70 and 100 ms. In order to determine the individual gradients, the final gradient is firstly determined. For this purpose, the gradient dn2 is defined such that the desired profile requires a defined time for passing through the range around the target rotational speed. Here, the change in the target rotational speed is also taken into consideration.

The gradient of the third section dn2 is calculated according to the formula $$dn2 = 2 * n\_tol / t\_syn + dn\_target$$

where n_tol represents the width of the tolerance range in one direction, t_syn represents the time for passing through the range, and dn_target represents the gradient of the target rotational speed. A rotational speed n2 at the start (t2) of the third section can thereby be calculated.

The gradient dn1 of the central section is defined so as to be greater than dn2 by a defined value, for example 1000 1/min/s. A rotational speed n1 at the start (t1) of the third section can thereby be calculated. Finally, the gradient dn0 of the first section is defined such that the desired rotational speed of the countershaft reaches the value n1 at the time t1:

$$dn0 = (n\_target0 - n0 + (3*dn\_target - dn1 - dn2)*t\_ab)/t\_ab$$

where n_target0 represents the target rotational speed at the time t0 and t_ab represents the duration of the individual sections.

Nominal gradients of the rotational speed of the countershaft are thereby determined with which the method as per FIG. 2 in block 46 can be continued. The nominal gradient during the first passing of the block 46 corresponds to the gradient dn0 of the first section from FIG. 3.

Figure 4:
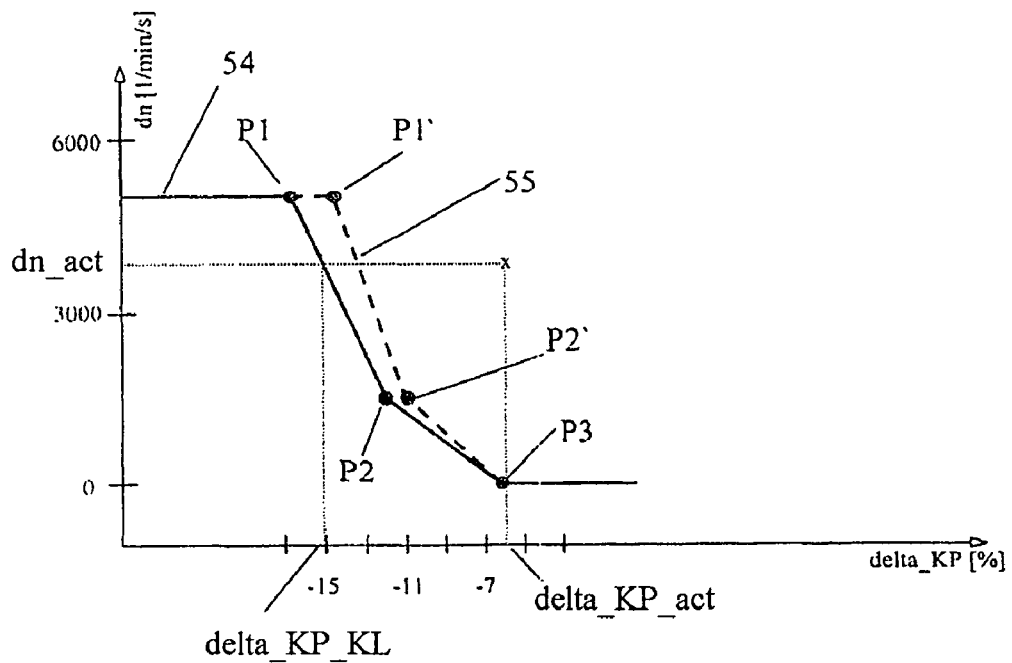
FIG. 4 shows a characteristic curve in which a rotational speed gradient is plotted against a clutch position.

In block 46, on the basis of the nominal gradient of the rotational speed of the countershaft, a nominal value for the clutch position is determined from a characteristic curve stored in the control device. An example for a characteristic curve of said type is illustrated in FIG. 4. In the characteristic curve 54, the nominal gradient dn is plotted in [1/min/s] over the deviation of the clutch position delta_KP from the contact point in [%]. Here, a negative deviation means a clutch position which is moved in the direction of the closed position in relation to the contact point. The characteristic curve is defined by three points P1, P2, P3, between which linear interpolation is carried out. For delta_KP values of less than the delta_KP value of P1 or greater than P3, the respective dn values are maintained. The nominal value of the clutch position from the characteristic curve is subsequently set at the clutch.

In the following query block 47, it is checked as to whether there is a risk of the profile of the rotational speed of the countershaft overshooting the target rotational speed. For this purpose, on the basis of the present rotational speed of the countershaft and under the assumption that the present rotational speed gradient is maintained, the profile of the rotational speed is pre-calculated. Here, it is checked as to whether the rotational speed is expected to reach the desired range around the target rotational speed within a definable timespan which can be for example 20-50 ms. If the check is positive, then in block 48, a nominal gradient of 0 is defined and the nominal value for the clutch position is defined correspondingly.

If the check is negative, then it is checked in query block 49 as to whether a change in the nominal gradient of the rotational speed of the countershaft is necessary. If the nominal gradient briefly has the value dn0, then it is checked as to whether the present rotational speed is greater than or equal to n1; if the nominal gradient briefly has the value dn1, then it is checked as to whether the present rotational speed is greater than or equal to n2. If the check is positive, then in block 50, a new nominal gradient is defined. The nominal gradient thus varies either from dn0 toward dn1 or from dn1 toward dn2.

In the event of a negative result of the check in query block 49 or after the end of the block 50, the block 46 is repeated.

The method has no end block since it is carried out until the target gear is engaged by another method (not described here) and the method according to FIG. 2 is terminated. A termination can also be terminated by means of other superordinate methods.

The characteristic curve according to FIG. 4, in which the nominal gradient dn is plotted against the deviation of the clutch position delta_KP from the contact point, is continuously adapted to the actual conditions. For this purpose, the gradient of the countershaft which occurs at a set clutch position is determined. An example for an operating point which is measured in such a way is illustrated in FIG. 4 as "x" with a delta_KP value of delta_KP_act and a dn value of dn_act. With said dn value of dn_act, the delta_KP value delta_KP_KL, which would be given by the characteristic curve at said dn value, is determined. Subsequently, the difference between delta_KP_act and delta_KP_KL is determined and multiplied by a factor which can for example lie between 0.05 and 0.3. The multiplication results in a value by which the associated characteristic curve points (in this case P1 and P2) are moved, inversely proportionally to their spacing to dn_act, in the direction of the measured operating point. The resulting points P1' and P2' are likewise illustrated in FIG. 4. The dashed line 55 shows the new resulting characteristic curve which is then generated and which is used during the next run-through of the method.

In the adaptation of the characteristic curve, the new resulting points P1' and P2' can be directly stored. Alternatively, only the deviations of the new points from the originally stored points can be stored.

Since the behavior of the clutch is also dependent on the temperature of the clutch or the temperature of a transmission oil, a temperature-dependent offset can also be taken into consideration in the characteristic curve. The offset is stored the control device in a temperature characteristic curve over the temperature. In the formation and evaluation of the characteristic curve, the offset is added to the delta_KP values of the interpolation points P1, P2 and P3.

At several points, the described method utilizes the contact position of the clutch. Said contact position can for example be determined by a further method. In addition to the direct utilization of the contact position, it is also possible for in each case the smallest and greatest values of the contact position up to that time to be measured and considered as a basis for the described calculations of the mean value of the two values. The two extreme values can likewise be adapted, for example by virtue of the smallest value being increased by a stored value, for example 0.2%, and the greatest value being decreased by the same amount, during every initialization of the control device (for example every time the ignition of the motor vehicle is switched on).

It is also possible for the clutch position at which the countershaft reacts to the closing of the clutch to be used as a contact position for the momentary execution of the method. The clutch position corresponds to the clutch position at the transition from query block 43 to query block 44.

What is claimed is:

1. A method of adjusting a rotational speed of a shaft of a gear change transmission (10) of a motor vehicle including an automated clutch (12) arranged between the gear change transmission (10) and a drive motor (35), wherein the rotational speed is controlled by means of a torque derived from the drive motor (35) and transmitted by the automated clutch (12), said method comprising the steps of:
defining a desired value for a position of the clutch (12) as a function of a rotational speed difference between a measured rotational speed of the shaft (16) and a target rotational speed, adjusting the speed of the shaft (16) to a range around the target speed and executing the gear change.

2. The method as claimed in claim 1, wherein in a control device (34) which activates the clutch (12) and the gear change transmission (10), a clutch position providing for a contact point of the clutch (12) is stored and the desired value of the clutch position is defined relative to the contact point.

3. The method as claimed in claim 2, wherein the desired value of the clutch position is defined such that, in the event of a large rotational speed difference, the rotational speed of the shaft (16) changes more quickly than in the event of a small rotational speed difference.

4. The method as claimed in claim 2, wherein
a relationship between a characteristic variable which represents an expected change in the rotational speed of the shaft (16) and the clutch position is stored in the control device (34),
on the basis of said rotational speed difference, a desired value for the characteristic variable is determined, and based on
the desired value for the characteristic variable and the stored relationship, the desired value for the clutch position is determined.

5. The method as claimed in claim 4, wherein on the basis of a comparison of the characteristic variable actually given at a set clutch position with the stored characteristic variable, the relationship between the characteristic variable and the clutch position is corrected.

6. The method as claimed in claim 4, wherein
on the basis of a momentary measured rotational speed of the shaft (16) and the resulting rotational speed difference with respect to the target rotational speed, a desired profile of the rotational speed of the shaft is determined,
on the basis of the desired profile, a profile for the desired value of the characteristic variable is determined, and
based on the stored relationship between the characteristic variable and the clutch position, the desired value for the clutch position is determined.

7. The method as claimed in claim 6, wherein in the determination of the desired profile of the rotational speed of the shaft (16), a possible change in the target rotational speed is taken into consideration.

8. The method as claimed in claim 6, wherein the desired profile of the rotational speed is composed of at least two sections with a constant rotational speed gradient.

9. The method as claimed in claim 6, wherein
the clutch position, proceeding from a start position, is varied in the direction of the closed position of the clutch (12),
the rotational speed of the shaft (16) is observed and
in the event of a significant change in the rotational speed, the desired profile of the rotational speed is determined.

10. The method as claimed in claim 9, wherein the start position is defined such that no positive gradient of the rotational speed of the shaft (16) is to be expected.

11. The method as claimed in claim 9, wherein
the profile of the rotational speed of the shaft (16) is monitored,
it is checked as to whether the profile meets a defined condition, and
in the event of the condition being met, an offset value is determined, by which the nominal values of the clutch positions determined during the method are moved in the direction of the closed position.

12. The method as claimed in claim 1, wherein
on the basis of a momentary rotational speed of the shaft (16) and a momentary rotational speed gradient, a future profile of the rotational speed is estimated,
it is checked as to whether the profile meets a defined condition, and
when a positive result of the check, the desired value of the clutch position is defined such that a gradient of the rotational speed of zero is to be expected.

13. A control device of a gear change transmission of a motor vehicle, with an automated clutch (12) being arranged between the gear change transmission (10) and a drive motor (35), and the control device (34) being provided to adjust a rotational speed of a shaft (16) of the gear change transmission (10) by means of a torque of the drive motor (35) transmitted by the clutch (12), the control device (34) being provided to define a desired value for a clutch position of the clutch (12) as a function of a rotational speed difference between a measured rotational speed of the shaft (16) and a target rotational speed.

* * * * *